US005294934A

United States Patent [19]

Matsumoto

[11] Patent Number: 5,294,934

[45] Date of Patent: Mar. 15, 1994

[54] PHASE MEASURING CIRCUIT OF PHASED ARRAY ANTENNA

[75] Inventor: Soichi Matsumoto, Amagasaki, Japan

[73] Assignee: Mitsubishi Denki Kabushiki Kaisha, Tokyo, Japan

[21] Appl. No.: 972,930

[22] Filed: Nov. 6, 1992

[30] Foreign Application Priority Data

Nov. 13, 1991 [JP] Japan ........ 3-327102

[51] Int. Cl.[5] ........ G01S 7/40

[52] U.S. Cl. ........ 342/173; 434/2; 342/169

[58] Field of Search ........ 342/360, 173, 174, 169, 342/170; 434/2

[56] References Cited

U.S. PATENT DOCUMENTS 4,560,987 12/1985 Dochow et al. ........ 434/2
4,949,090 8/1990 Tamii et al. ........ 342/173
5,086,302 2/1992 Miller ........ 342/373

FOREIGN PATENT DOCUMENTS 57-162803 10/1982 Japan .
2224887 5/1990 United Kingdom .

OTHER PUBLICATIONS

"Phased Array Technology Workshop" Microwave Journal, Sep. 9-10, 1981 pp. 16-22.

Seiji Mano et al., "A Method for Measuring Amplitude and Phase of Each Radiating Element of a Phased Array Antenna", Institute of Electronics and Comm. Engineers of Japan, vol. J65-B, pp. 555-560.

*Primary Examiner*—Theodore M. Blum
*Attorney, Agent, or Firm*—Rothwell, Figg, Ernst & Kurz

[57] ABSTRACT

A phase measurement circuit of a phased array antenna having both transmitting and receiving functions includes a plurality of antenna elements arranged in a line or on a plain; phase shifters disposed corresponding to the antenna elements, respectively, for shifting phases of signals to form a beam in a desired direction by changing the phase value; a control circuit for controlling the phase shift quantity of the phase shifter; a test antenna for receiving electric wave of a transmission frequency band from the phased array antenna and transmitting a test signal for measuring an excitation phase to each element of the phased array antenna; and a test translator for converting a frequency of the signal of the transmission frequency band received by the test antenna to that of the signal of a reception frequency band and outputting it as a test signal to the test antenna. Thus, a loop of the signal is formed between the terminal for the transmitted signal and the terminal for the received signal in the phased array antenna, whereby the phases of transmitting and receiving systems can be respectively measured.

3 Claims, 6 Drawing Sheets

PHASE MEASURING CIRCUIT OF PHASED ARRAY ANTENNA

FIELD OF THE INVENTION

The present invention relates to a phase measuring circuit and, more particularly to a phase measuring circuit used for setting a phase or performing a failure diagnosis for each element, of a phased array antenna in which different frequencies are employed for transmission and reception, as is used in a field of satellite communication.

BACKGROUND OF THE INVENTION

FIG. 4 is a block diagram of a conventional phase measuring circuit of a phased array antenna disclosed in Japanese Published Patent Application No. 55-170159, and FIG. 5 is a block diagram showing a conventional phase measuring circuit of a phased array antenna having both functions of transmission and reception. In FIGS. 4 and 5, reference numeral **1*i* (i=1 to n) designates an element antenna. A phase shifter for reception 2*i* (i=1 to n) shifts the phase of the signal received by the element antenna 1*i*. A phase shifter for transmission 3*i* (i=1 to n) shifts the phase of the signal transmitted by the element antenna 1*i*. A control circuit 4 controls the phase of the phase shifters 2*i* and 3*i*. A combiner circuit 5 combines the signal received by the element antenna 1*i*. Reference numeral 7 designates a terminal for the received signal. A phased array antenna 9 of FIG. 4 comprises the element antenna 1*i*, the phase shifter for reception 2*i*, the control circuit 4, the combiner circuit 5, and the terminal 7. A test antenna 10 transmits and receives a test signal so as to measure the phase of the phased array antenna 9. A signal generator 11 generates a test signal to be applied to the test antenna 10*a*. A receiver 12 receives the test signal which is received by the test antenna 10*b*, where the received test signal is a signal resulting from that the test signal is transmitted from the phased array antenna 9**.

The operation of the apparatus of FIG. 4 will be described with reference to FIG. 4. Combined electric field vector is represented by a vector sum of electric field vectors of the respective element antennas **1*i* while the whole arrays in the phased array antenna operate. Supposed the electric field vector of the 'i'th element antenna 1*i* be $E_i \exp(j\phi_i)$ where Ei is amplitude, $\phi_i$ is phase, j is imaginary unit, the combined electric field vector obtained when the phase of the 'i'th element antenna 1*i*** is shifted by degree is represented as follows;

$$E_1 = E_0 \exp(j\phi_0) - E_i \exp(j\phi_i)(1 - \exp(j\Delta)) \tag{1}$$

The above equation (1) is transformed to;

$$|E_1|^2/E_0^2 = (Y^2 + K^2) + 2YK\cos(\Delta + \Delta_0) \tag{2}$$

where $$Y^2 = (\cos X - K)^2 + \sin^2 X \tag{3}$$

$$\tan \Delta_0 = \sin X/(\cos X - K) \tag{4}$$

$$K = E_n/E_0 \text{ (relative amplitude)} \tag{5}$$

$$X = \phi_i - \phi_0 \text{ (relative phase)} \tag{6}$$

Supposed the ratio of the maximum to the minimum of the equation (2) be $r^2$, the following equation is obtained.

$$r^2 = (Y+K)^2/(Y-K)^2 \tag{7}$$

In addition, from the equation (2), $-\Delta_0$ is a phase change which provides the maximum value of $|E_1|^2/Eo^2$, namely, the relative electric power, and these r and $\Delta_0$ are obtained from the measurement of the relative electric power of the equation (2).

More specifically, in case of the phased array antenna for reception, a signal from the signal generator 11 is transmitted from the test antenna 10 and the signal is received by the 'i'th element antenna **1*i*. The signal received by the 'i'th element antenna 1*i* is shifted in its phase by the phase shifter 2*i* under the control by the control circuit 4. The signals received by the respective element antennas 1*i* are combined by the combiner circuit 5. Then, the ratio r of the maximum to the minimum of the signal from the receiving signal terminal 7 and the phase quantity $\Delta_0$ attaining the maximum value are measured. By employing the equations (1) to (7) using these values, a relative amplitude and a relative phase of the 'i'th element antenna 1*i* can be obtained. By conducting this measurement and this calculation for all element antennas 1*i* (i=1 to n), the relative amplitude and the relative phase of the respective element antennas 1*i*** (i=1 to n) can be obtained.

FIG. 5 shows a conventional phase measuring circuit of a phased array antenna having transmitting and receiving functions. The circuit of FIG. 5 includes, in addition to the elements of the phase measuring circuit having only a receiving function shown in FIG. 4, a divider circuit 6 for dividing the transmitted signal to the element antenna **1*i*, a terminal for a transmitted signal 8, and phase shifters for transmission 3*i*** (i=1 to n).

In this phased array antenna **9*b*, the signal from the signal terminal 8 is divided by the divider circuit 6 and the phase of the divided signal is respectively shifted by the phase shifter for transmission 3*i* under the control by the control circuit 4. The phase-shifted signal is then excited by the element antenna 1*i* and emitted into the space. The signal radiated from the respective element antennas 1*i* is received by the test antenna 10*b* and the received signal is received and processed by the receiver for test 12. The ratio r of the maximum to the minimum of the signal change of the received signal and the phase quantity $\Delta_0$ for attaining the maximum value are measured and the equations (1) to (7) are operated to obtain the relative amplitude and the relative phase of the 'i'th element antenna 1*i* in the transmission system. By performing measurement and calculation for all element antennas, the relative amplitude and the relative phase of respective element antennas 1*i*** (i=1 to n) can be obtained.

FIG. 6 is a block diagram showing a conventional antenna diagnosis apparatus disclosed in Japanese Published Patent Publication No. 57-162803, in which the phase and the amplitude of the element antenna are set and processed by the measuring and operating circuit and the diagnosis circuit. Referring to FIG. 6, reference numeral 101 designates an element antenna. A phase shifter 102 shifts the phase of the transmission signal to be transmitted from the element antenna 101. A divider circuit 103 divides the transmission signal to the element antenna 101. Reference numerals 104 and 108 designate transmission sources. An antenna 109 is confronted to element antennas 1*i*. A control circuit 111 controls the phase shifter 102. A measuring and operating circuit 112 measures the level change of the combined and received signal output of the whole element antennas and operating the amplitude and the phase of each element antenna. A diagnosis circuit 113 compares its measured and operated result with a reference value to diagnose the measured result. A switch 110 selects one from a state where the signal from the transmission source 104 is applied to the array antenna or the signal received by the respective antenna 101 which is transmitted from the confronting antenna 109 is supplied, to the control circuit 111.

The operation will be described with reference to FIG. 6. When the amplitude and the phase of each element antenna 101 is diagnosed during the whole array operate, the switch 110 is switched to the side of the control circuit 111 and, at the same time, the transmission source 108 is operated, whereby the electric wave is transmitted from the confronting antenna 109. Then, on the bases of the same measuring theory as performed in the apparatus shown in FIGS. 4 and 5, the phase of the signal of each element antenna 101 is shifted by the phase shifter 102 under the control by the control circuit 111, the change in the combined output level of the whole array is measured by the measuring and operating circuit 112, then the amplitude and the phase of each element antenna 101 are calculated, and the results are transmitted to the diagnosis circuit 113. In the diagnosis circuit 113, the amplitude and the phase value of each element antenna which are measured and calculated after receiving the electric wave from the confronting antenna 109 at the start of operation of the phased array antenna with setting the conditions, such as set phase, frequency, and polarization of each element antenna 101, and the set position of the confronting antenna 109 at the same, are stored. Thus, the above-described measured results are compared with the data of reference amplitude and reference phase at the start of operation, and when the result of this diagnosing shows that the phase is shifted as compared with the reference phase, the control of the corresponding phase shifter is changed so as to correct the phase of the element which is shifted with relative to the reference.

In the conventional phase measurement circuit of a phased array antenna having such a structure, it is necessary to provide measuring circuits of transmission and reception systems separately in a phase measuring circuit of the phased array antenna having transmitting and receiving functions for such as satellite communication, and this makes the apparatus large in size and the control by the control circuit complicated. Further, when a phase measuring circuit is incorporated in the phased array antenna as a failure diagnosis circuit, its structure is particularly complicated.

SUMMARY OF THE INVENTION

It is an object of the present invention to provide a small-sized and simply controllable phase measuring circuit of a phased array antenna, included in a phased array antenna having transmitting and receiving functions and different frequencies for transmission and reception.

It is another object of the present invention to provide a phase measuring circuit of a phased array antenna incorporating a failure diagnosis circuit.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to a first aspect of the present invention, in a phase measuring circuit of a phased array antenna, a test signal for phase measurement is transmitted from a transmitter of the phased array antenna, the transmitted test signal is received by a test antenna and a test translator converts the frequency of the received signal to that of a receiving band, the frequency converted signal is transmitted to the phased array antenna from the test antenna and the signal is received by a receiver of the phased array antenna. Thus, a loop of the signal is formed between the terminal for the transmitted signal and the terminal for the received signal in the phased array antenna, whereby the phases of transmitting and receiving systems can be respectively measured.

According to a second aspect of the present invention, in a phase measuring circuit of a phased array antenna, one of the element antennas of the phased array antenna is used as a test antenna and a test translator which converts the frequency of the electric signal of the transmission frequency band received by the test antenna to that of the electric signal in the receiving frequency band is provided in the phased array antenna. Thus, a failure diagnosis circuit can be incorporated in the phase measuring circuit.

According to a third aspect of the present invention, a phase measuring circuit of the phased array antenna includes a switching circuit for switching an excitation terminal of the test antenna comprising one of the element antennas to a test translator or to a phase shifter. Thus, the phase of each element of the phased array antenna can be measured without deteriorating beam formation function of the phased array antenna.

DETAILED DESCRIPTION OF THE PREFERRED EMBODIMENTS

Figure 1:
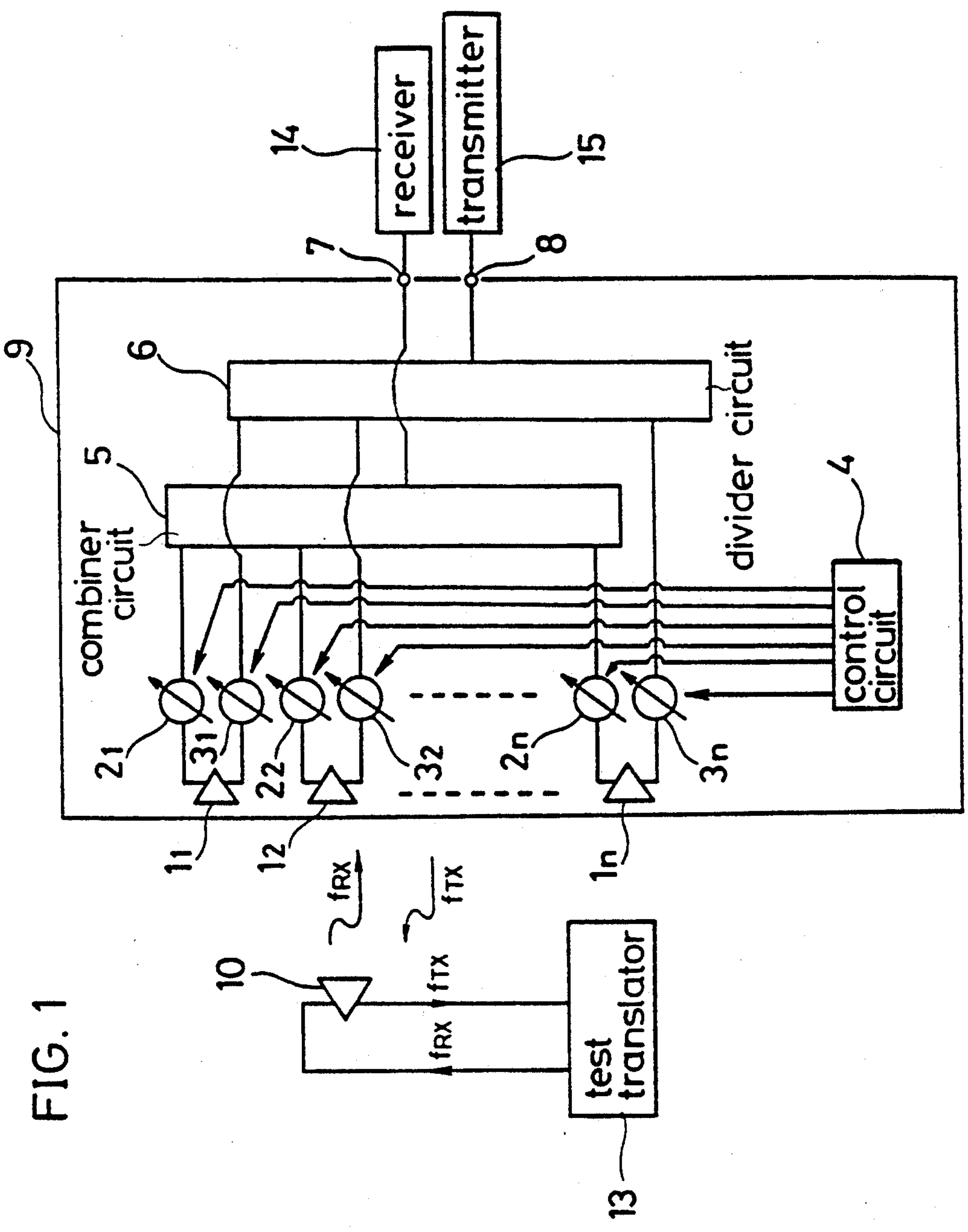
FIG. 1 is a block diagram showing a phased array antenna phase measuring circuit according to an embodiment of the present invention.

FIG. 1 is a block diagram showing a circuit for measuring a phase of a phased array antenna having transmitting and receiving functions according to an embodiment of the present invention. In FIG. 1, reference numeral 1*i* (i=1 to n) designates an element antenna. A phase shifter for reception 2*i* (i=1 to n) shifts the phase of the signal received by the element antenna 1$i$. A phase shifter for transmission 3$i$ (i=1 to n) shifts the phase of the signal transmitted by the element antenna 1$i$. A control circuit 4 controls the phase of the phase shifters 2$i$ and 3$i$. A combiner circuit 5 combines the signals received by the element antennas 1$i$. A divider circuit 6 divides the transmitted signal to the element antenna 1$i$. Reference numeral 8 designates a terminal for the transmitted signal. A phased array antenna 9 comprises the element antenna 1$i$, the phase shifters 2$i$ and 3$i$ for reception and transmission, respectively, the control circuit 4, the combiner circuit 5, the divider circuit 6, and the signal terminals 7 and 8. A test antenna 10 is provided for transmitting or receiving a test signal so as to measure the phase of the phased array antenna 9. A test translator 13 converts the signal of transmission band frequency received by the test antenna 10 to a signal of receiving band frequency. A receiver 14 receives a signal from the phased array antenna 9. A transmitter 15 sends out a signal of transmission frequency to the phased array antenna 9.

The operation of the apparatus of FIG. 1 will be described. A signal having a transmission frequency $f_{TX}$ is sent out from the transmitter 15 to the divider circuit 6 through the signal terminal 8 of the phased array antenna 9. Then, it is divided by the divider circuit 6 to the element antenna 1$i$ through the phase shifter for transmission 3$i$ and then the distributed signal is radiated from the element antenna 1$i$. The transmitted signal is received by the test antenna 10 and the signal is converted to a signal of a reception frequency $f_{RX}$ by the test translator 13. Then, it is emitted from the test antenna 10. The signal is received by the element antenna 1$i$ and sent out to the combiner circuit 5 through the phase shifter for reception 2$i$. In the combiner circuit 5, signals from the n element antennas 1$i$ are combined and then received by the receiver 14 through the signal terminal 7. Thus, a loop of the signal is formed between the signal terminals 8 and 7.

When the phase of the element antenna 1$i$ for reception is measured, the phase of the phase shifter for reception 2$i$ is changed by the control circuit 4 and the signal from the receiver 14 then is measured. Then, the ratio r of the maximum to minimum of this signal and the phase quantity $\Delta_0$ attaining the maximum value are measured, and the relative amplitude and the relative phase of the 'i'th element antenna 1$i$ for reception are obtained using the equations (1) to (7). Thus, the relative amplitude and the relative phase of the whole element antennas 1$i$ (i=1 to n) for reception can be obtained. In addition, the phase of the phase shifter for transmission 3$i$ is not changed then under the control by the control circuit 4.

Meanwhile, when the phase of each element antenna 1$i$ for transmission is measured, the phase of the phase shifter for transmission 3$i$ is changed by the control circuit 4 and the signal from the receiver 14 then is measured. Then, the ratio r of the maximum to the minimum of the signal and the phase quantity $\Delta_0$ attaining the maximum value are measured, and the relative amplitude and the relative phase of the 'i'th element antenna 1$i$ for transmission can be obtained using the equations (1) to (7). Thus, the relative amplitudes and the relative phases of the whole element antennas 1$i$ (i=1 to n) for transmission can be obtained. In addition, the phase of the phase shifter 2$i$ then is not changed under the control by the control circuit 4.

Although the test antenna and the test translator are provided outside the phased array antenna according to the above-described first embodiment, it may be of a construction that the test translator be provided in one of the element antennas of the phased array antenna as a failure diagnosis circuit and that element antenna function as a test antenna.

Figure 2:
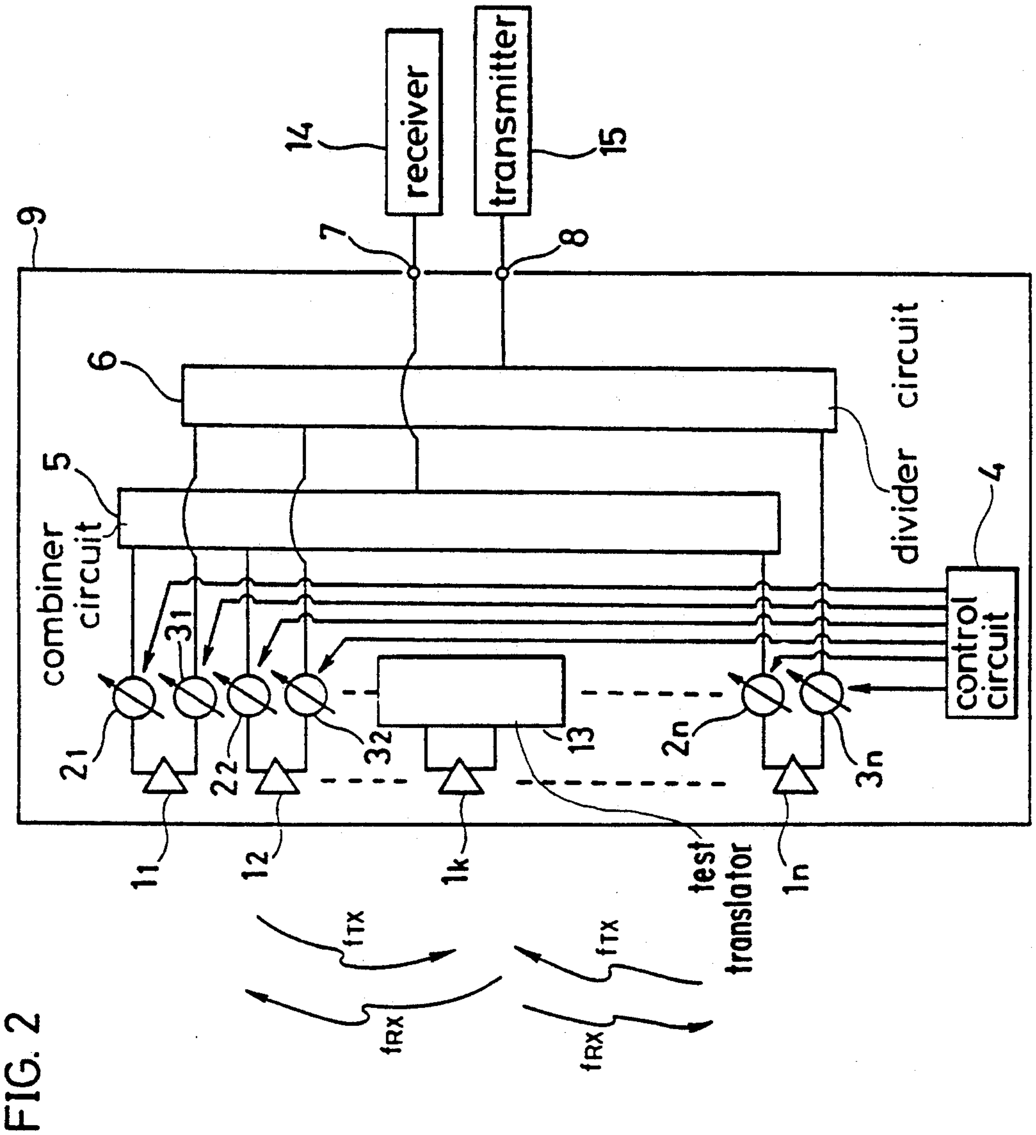
FIG. 2 is block diagram showing a phased array antenna phase measuring circuit according to another embodiment of the present invention.

FIG. 2 is a block diagram showing a circuit for measuring the phase of a phased array antenna having both transmitting and receiving functions according to a second embodiment of the present invention. In this circuit, a test translator 13 is incorporated in the 'k'th element antenna 1$k$ of the phased array antenna 9 and the 'k'th element antenna 1$k$ functions as a test antenna for transmitting or receiving a test signal for measuring the phase of the element antenna 1$i$ (i=1 to k−1, k+1 to n) of the phased array antenna 9. Therefore, in addition to the same effects as in the first embodiment of the present invention, an apparatus incorporating a failure diagnosis circuit is obtained.

While one of the element antennas of the phased array antenna functions as a test antenna in the above-described second embodiment, if there is provided in that element antenna a switching circuit for switching between a state providing a function of forming a beam of the phased array antenna and a state functioning as a test antenna for measuring the phase of each element antenna of the phased array antenna, the phase of each element antenna of the phased array antenna can be measured without deteriorating performance of beam formation of the phased array antenna.

Figure 3:
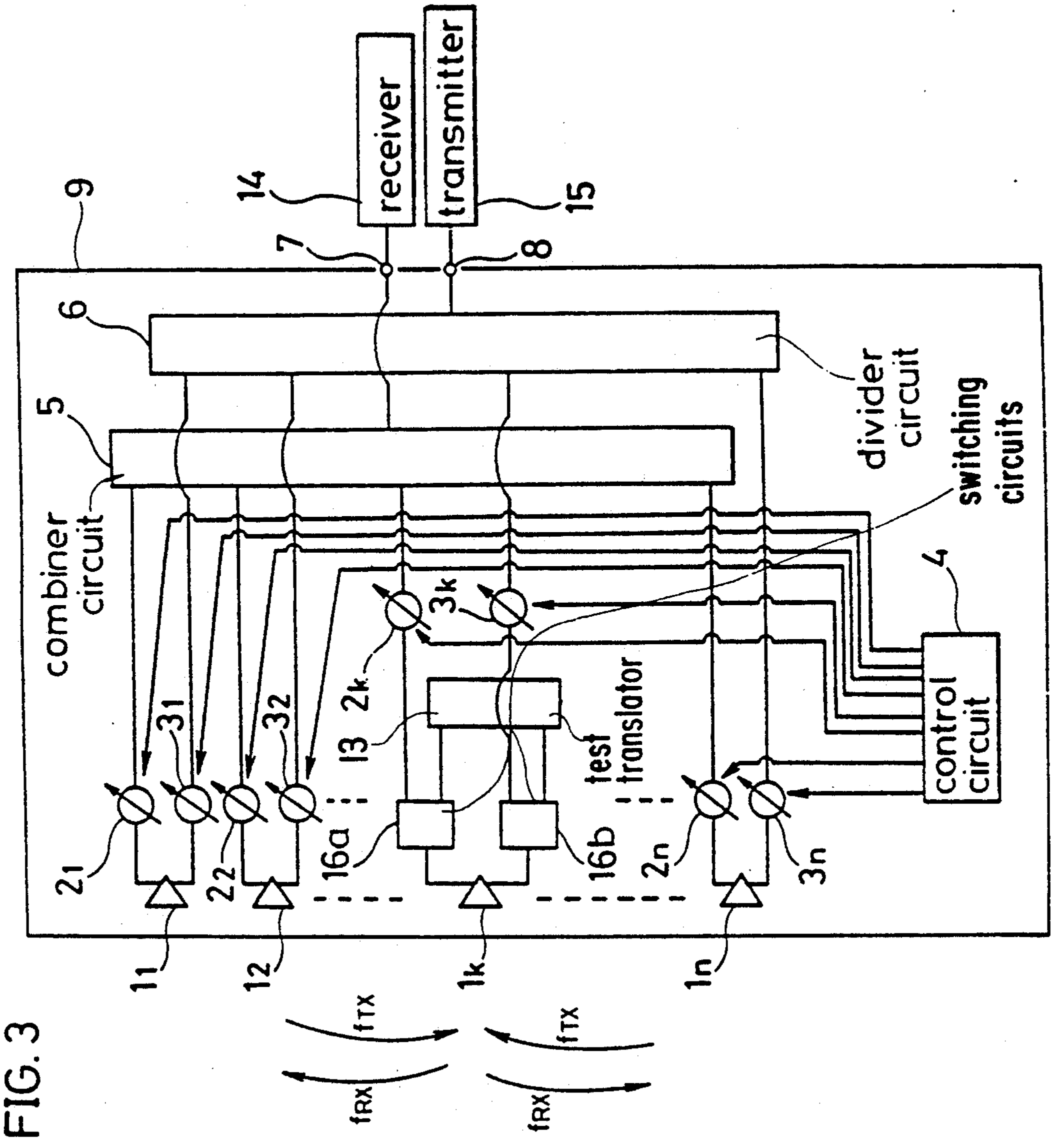
FIG. 3 is a block diagram showing a phased array antenna phase measuring circuit according to a still another embodiment of the present invention.
Figure 4:
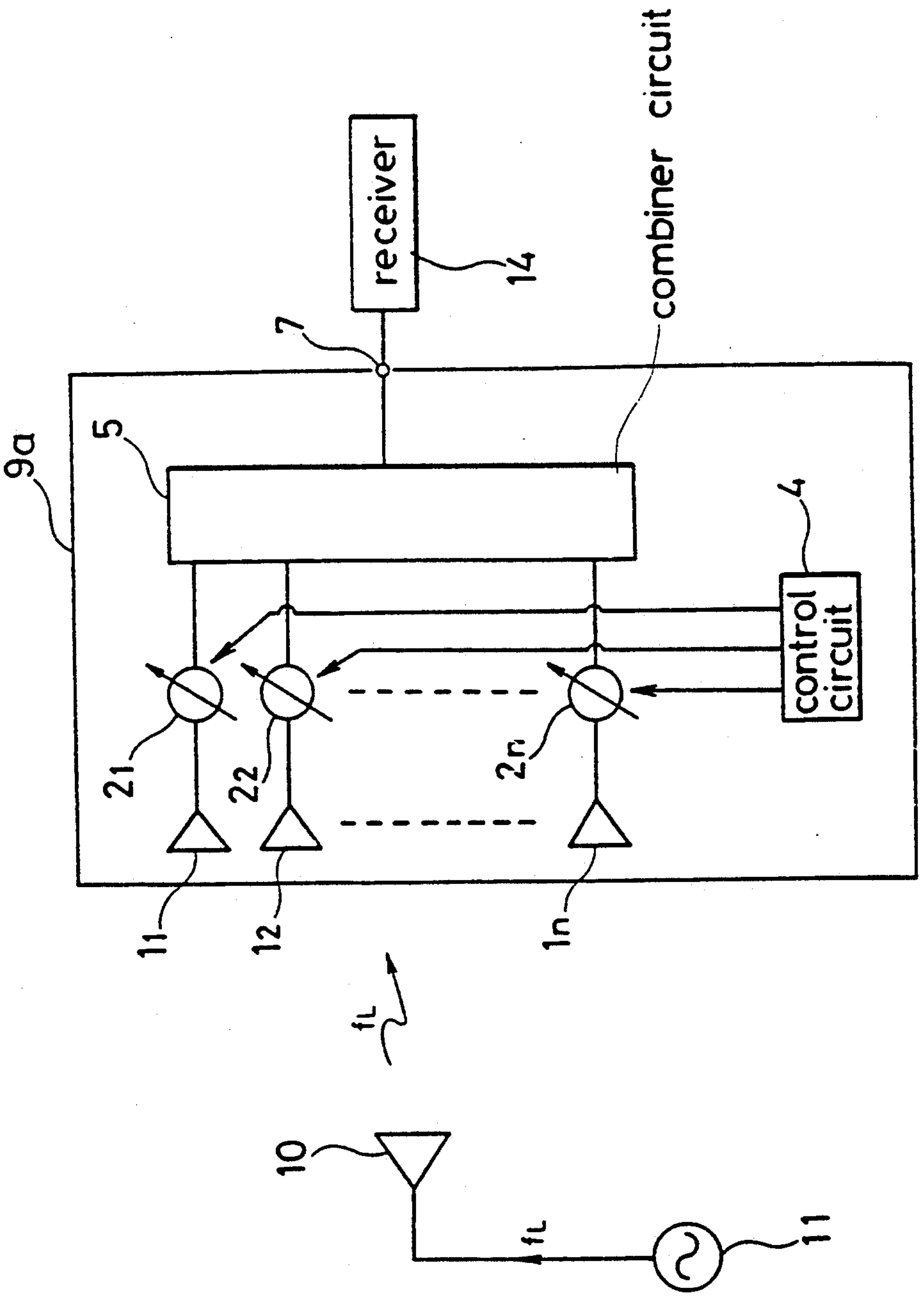
FIG. 4 (PRIOR ART)
FIG. 4 is a block diagram showing a conventional phase measuring circuit of a phased array antenna.
Figure 5:
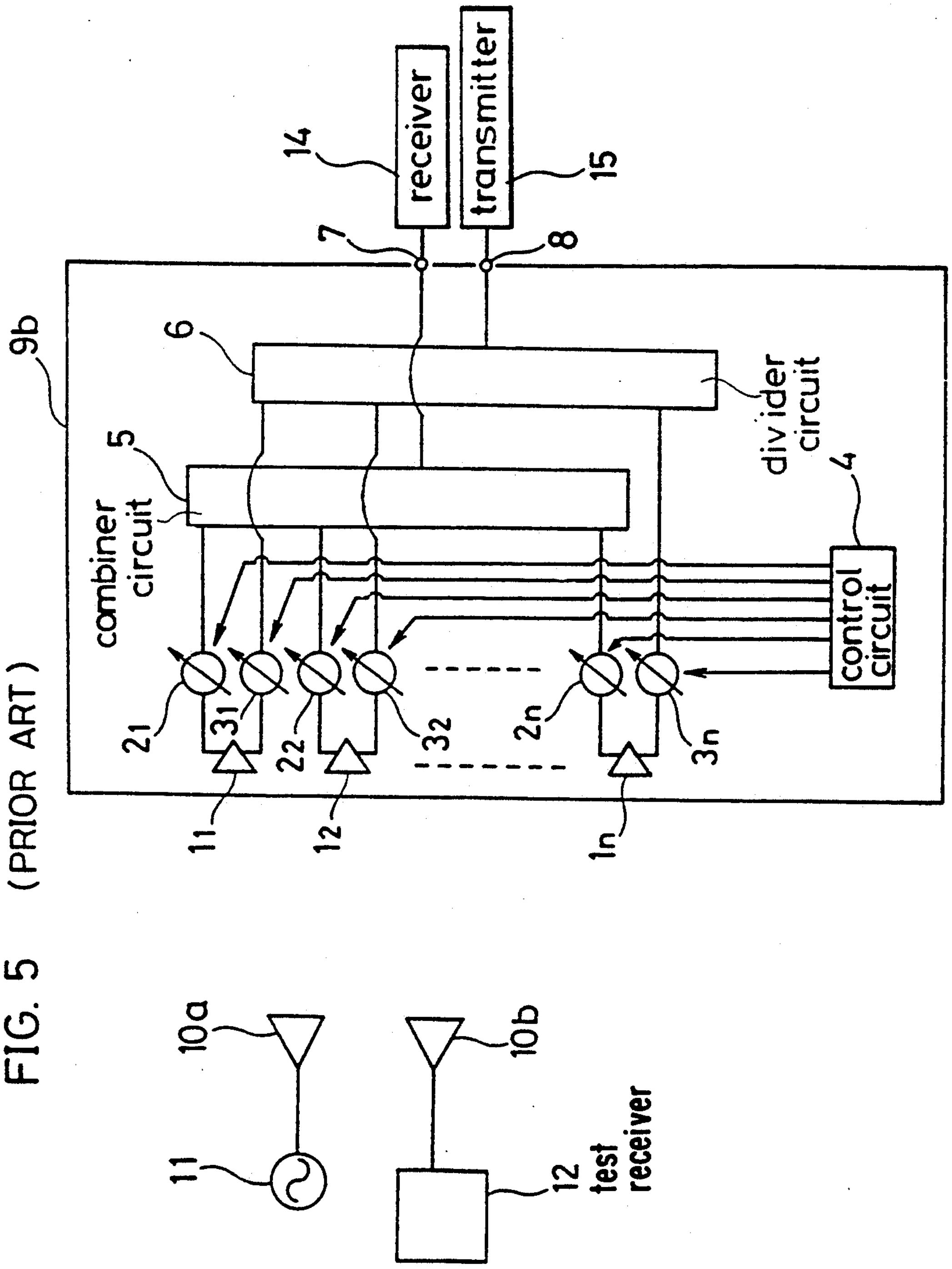
FIG. 5 (PRIOR ART)
FIG. 5 is a block diagram showing a conventional phase measurement circuit of a phased array antenna having transmitting and receiving functions.
Figure 6:
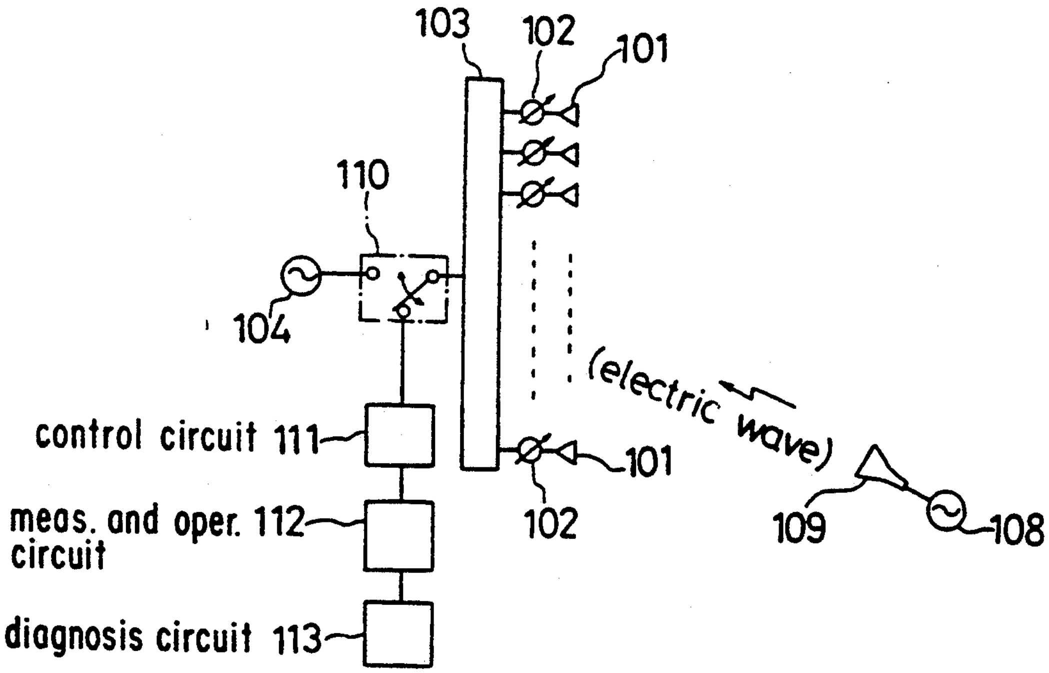
FIG. 6 (PRIOR ART)
FIG. 6 is a block diagram showing a conventional diagnosis apparatus of a phased array antenna having transmitting and receiving functions.

FIG. 3 is a block diagram showing a phase measuring circuit of a phased array antenna having both transmitting and receiving functions according to a third embodiment of the present invention. In FIG. 3, reference numeral 16$a$ designates a switching circuit for switching between a state sending a signal from the 'k'th element antenna 1$k$ to a phase shifter 2$k$ for reception and a state sending the test signal from the test translator 13 to the element antenna 1$k$ and reference numeral 16$b$ designates a switching circuit for switching between a state sending the signal from the phase shifter 3$k$ for transmission to the element antenna 1$k$ and a state sending the test signal from the test translator 13 to the element antenna 1$k$. In this circuit, the test translator 13 is incorporated in the 'k'th element antenna 1$k$ of the phased array antenna 9, so that the 'k'th element antenna 1$k$ functions as the test antenna for transmitting or receiving the test signal for measuring the phase of the element antenna 1$i$ (i=1 to k−1, k+1 to n) of the phased array antenna 9, and there are provided the switching circuits 16$a$ and 16$b$ connected to between the element antenna 1$k$ and the phase shifters 2$i$ and 3$i$, respectively, to switch to functioning as beam formation. As a result, in addition to the same effect as in the above-described first and second embodiments, a failure diagnosis circuit can be incorporated. In addition, the phase of each element of the phased array antenna can be measured without deteriorating performance of beam formation of the phased array antenna.

As described above, according to the present invention, a test signal for measuring a phase is transmitted from a transmitter of the phased array antenna, a test translator is provided to convert a frequency of the signal received by the test antenna to a frequency of a reception band, the test signal is received by a receiver of the phased array antenna, and a loop of the signal is formed between signal terminals for transmission and reception. Thus, there is provided a small-sized and simply controlled circuit for measuring the phase of the phased array antenna having transmitting and receiving junctions and employing different frequencies for transmission and reception.

In addition, according to the present invention, one of element antennas of the phased array antenna is provided as a test antenna, and there is provided a test translator in the phased array antenna, which converts a frequency of electric wave of a transmission frequency band received by the test antenna to a frequency of electric wave of a reception frequency band. Thus, there can be provided a small-sized and simply controlled circuit for measuring the phase of the phased array antenna and its failure diagnosis circuit can be provided therein.

In addition, according to the present invention, one of the element antennas of the phased array antenna functions as the test antenna, a test translator for converting the frequency of signal of a transmission frequency band received by the test antenna to that of signal of a reception frequency band is provided in the phased array antenna, and a switching circuit for connecting an excitation terminal of the test antenna to the test translator or to the phase shifter is incorporated in the phased array antenna. Thus, there can be provided a small-sized and simply controlled phased array antenna phase measurement circuit, its failure diagnosis circuit can be provided therein, and the phase of each element of the phased array antenna can be measured without deteriorating the performance of beam formation of the phased array antenna.

What is claimed is:

1. A phase measurement circuit of a phased array antenna having both transmitting and receiving functions and having a transmission frequency band and a reception frequency band of different frequencies, comprising:

- a plurality of antenna elements arranged in an array;
- phase shifters disposed corresponding to said antenna elements, respectively, for shifting phases of signals to form a beam in a desired direction by changing the phase value;
- a control circuit for controlling the phase shift quantity of said phase shifter;
- a test antenna for receiving electromagnetic waves in the transmission frequency band from the phased array antenna and transmitting a test signal for measuring an excitation phase to each element of the phased array antenna; and
- a test translator for converting the frequency of the signal of the transmission frequency band received by the test antenna to that of the signal of the reception frequency band and outputting the converted signal as a test signal to the test antenna.

2. A phase measurement circuit of a phased array antenna having both transmitting and receiving functions and having a transmission frequency band and a reception frequency band of different frequencies, comprising:

- a plurality of antenna elements arranged in an array;
- phase shifters disposed corresponding to said antenna elements, respectively, for shifting phases of signals to form a beam in a desired direction by changing the phase value;
- a control circuit for controlling the phase shift quantity of said phase shifter;
- a test antenna for receiving electromagnetic waves in the transmission frequency band from the phased array antenna and transmitting a test signal for measuring an excitation phase to each element of the phased array antenna; and
- a test translator for converting the frequency of the electromagnetic waves of the transmission frequency band received by the test antenna to that of the electromagnetic waves of the reception frequency band and outputting the converted signal as a test signal to the test antenna, in which one of the element antennas of the phased array antenna functions as said test antenna, and said test translator is incorporated in the phased array antenna.

3. A phase measurement circuit of a phased array antenna having both transmitting and receiving functions and having a transmission frequency band and a reception frequency band of different frequencies, comprising:

- a plurality of antenna elements arranged in an array;
- phase shifters disposed corresponding to said antenna elements, respectively, for shifting phases of signals to form a beam in a desired direction by changing the phase value;
- a control circuit for controlling the phase shift quantity of said phase shifter;
- a test antenna for receiving electromagnetic waves in the transmission frequency band from the phased array antenna and transmitting a test signal for measuring an excitation phase to each element of the phased array antenna; and
- a test translator for converting the frequency of the electromagnetic waves of the transmission frequency band received by the test antenna to that of the electromagnetic waves of a reception frequency band and outputting the converted signal as a test signal to the test antenna, in which one of element antennas of the phased array antenna functions as said test antenna, said test translator is incorporated in the phased array antenna, and there is provided in the phased array antenna a switching circuit for connecting an excitation terminal of said test antenna to said test translator or to said phase shifter.

* * * * *